(12) United States Patent
Suryaprakash et al.

(10) Patent No.: US 9,886,080 B2
(45) Date of Patent: Feb. 6, 2018

(54) LOW VOLTAGE DETECTION AND INITIALIZATION FOR NON-VOLATILE MEMORY SYSTEMS

(71) Applicant: SanDisk Technologies Inc., Plano, TX (US)

(72) Inventors: Anil Kumar Thadi Suryaprakash, Bangalore (IN); Krishnamurthy Dhakshinamurthy, Bangalore (IN); Ajay Dhingra, Bangalore (IN); Rampraveen Somasundaram, Tiruvannamalai (IN); Narendhiran Chinnaanangur Ravimohan, Bangalore (IN); Bhavin Odedara, Bangalore (IN); Srikanth Bojja, Bangalore (IN); Jayanth Thimmaiah, Bangalore (IN)

(73) Assignee: SanDisk Technologies LLC, Plano, TX (US)

( * ) Notice: Subject to any disclaimer, the term of this patent is extended or adjusted under 35 U.S.C. 154(b) by 0 days.

(21) Appl. No.: 14/698,255

(22) Filed: Apr. 28, 2015

(65) Prior Publication Data

US 2016/0188245 A1 Jun. 30, 2016

(30) Foreign Application Priority Data

Dec. 30, 2014 (IN) .......................... 4225/MUM/2014

(51) Int. Cl.
*G06F 3/00* (2006.01)
*G06F 13/12* (2006.01)
*G06F 13/42* (2006.01)
*G06F 1/32* (2006.01)

(52) U.S. Cl.
CPC .......... *G06F 1/3287* (2013.01); *G06F 1/3253* (2013.01); *G06F 1/3296* (2013.01); *Y02B 60/1235* (2013.01); *Y02B 60/1285* (2013.01)

(58) Field of Classification Search
None
See application file for complete search history.

(56) References Cited

U.S. PATENT DOCUMENTS

| | | | | |
|---|---|---|---|---|
| 5,490,117 A | * | 2/1996 | Oda | G01R 31/31715 365/189.16 |
| 5,828,892 A | * | 10/1998 | Mizuta | G06F 1/26 365/226 |
| 2004/0103330 A1 | * | 5/2004 | Bonnett | G06F 1/3203 713/322 |
| 2008/0133860 A1 | | 6/2008 | Kanamori et al. | |
| 2011/0022789 A1 | * | 1/2011 | Fujimoto | G06F 1/266 711/103 |
| 2011/0231690 A1 | * | 9/2011 | Honda | G11O 5/147 713/340 |

* cited by examiner

*Primary Examiner* — David E Martinez
(74) *Attorney, Agent, or Firm* — Brinks Gilson & Lione

(57) ABSTRACT

A non-volatile memory system may include detection circuitry configured to detect that a host system is configured to initially communicate a clock signal and initialization command signals at a voltage level lower than its input/output driver circuit is configured to receive the signals. In response to the detection, the detection circuitry may switch a regulator circuit from a high voltage mode to a low voltage mode so that the input/output driver circuit is ready to receive the initialization commands at the lower voltage level.

13 Claims, 11 Drawing Sheets

200 →

| S | D | Index | Busy | HCS | XPC | S18R | OCR | CRC7 | E |

| S | D | Index | Busy | CCS | UHS-II | S18A | OCR | CRC7 | E |

FIG. 3

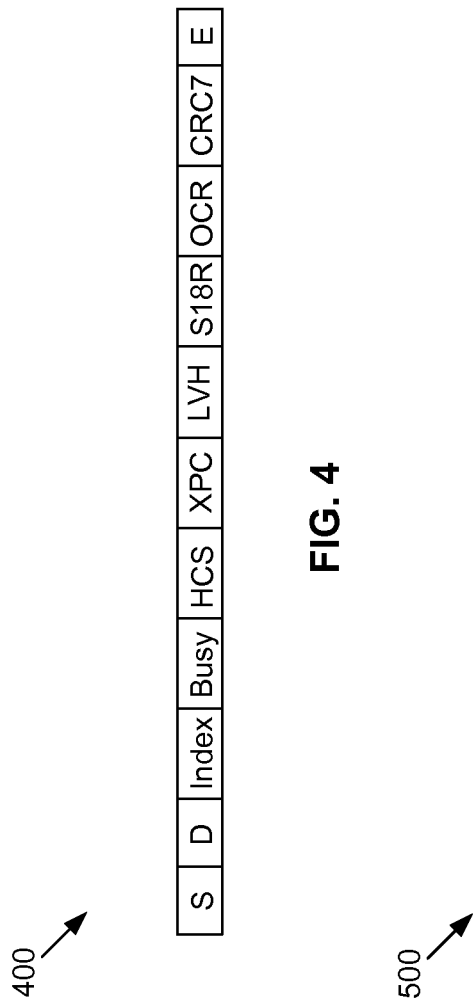

LOW VOLTAGE DETECTION AND INITIALIZATION FOR NON-VOLATILE MEMORY SYSTEMS

CROSS-REFERENCE TO RELATED APPLICATIONS

This application claims priority to Indian Patent Application No. 4225/MUM/2014, filed Dec. 30, 2014. The contents of Indian Patent Application No. 4225/MUM/2014 are incorporated by reference in their entirety.

BACKGROUND

Secure Digital (SD) and microSD products are supported by various host chipsets, such as those related to mobile, imaging, and video recording applications, as examples. SD and microSD products may be initialized by communicating input/output (I/O) signaling messages with the host device at 3.3 volts (V). For some SD configurations, such as those compatible with Ultra High Speed I (UHS-I), which operates at lower voltage, such as 1.8V or 1.2V, after SD card initialization with I/O signaling at the 3.3 V level, the I/O signaling level will switch from the higher 3.3 V to a lower voltage, i.e. 1.8 V or 1.2 V, through SD command protocol sequence. Such switching may be possible when both the host device and the SD product are capable of communicating at both the higher and lower voltage levels. However, as SD host chipsets migrate to lower process modes, such as lower application specification integrated circuit (ASIC) process modes, host devices may no longer be able to communicate at the higher 3.3 V. As such, a configuration for SD and microSD products that enables such products to communicate with various types of legacy, current, and future SD host devices may be desirable.

BRIEF DESCRIPTION OF THE DRAWINGS

The accompanying drawings, which are incorporated in and constitute a part of this specification illustrate various aspects of the invention and together with the description, serve to explain its principles. Wherever convenient, the same reference numbers will be used throughout the drawings to refer to the same or like elements.

FIG. 2 is a schematic diagram of an example synchronization message.

FIG. 3 is a schematic diagram of an example response to the synchronization message of FIG. 2.

FIG. 4 is a schematic diagram of another example synchronization message.

FIG. 5 is a schematic diagram of an example response to the synchronization message of FIG. 4.

DETAILED DESCRIPTION OF THE PRESENTLY PREFERRED EMBODIMENTS

Overview

Figure 1:
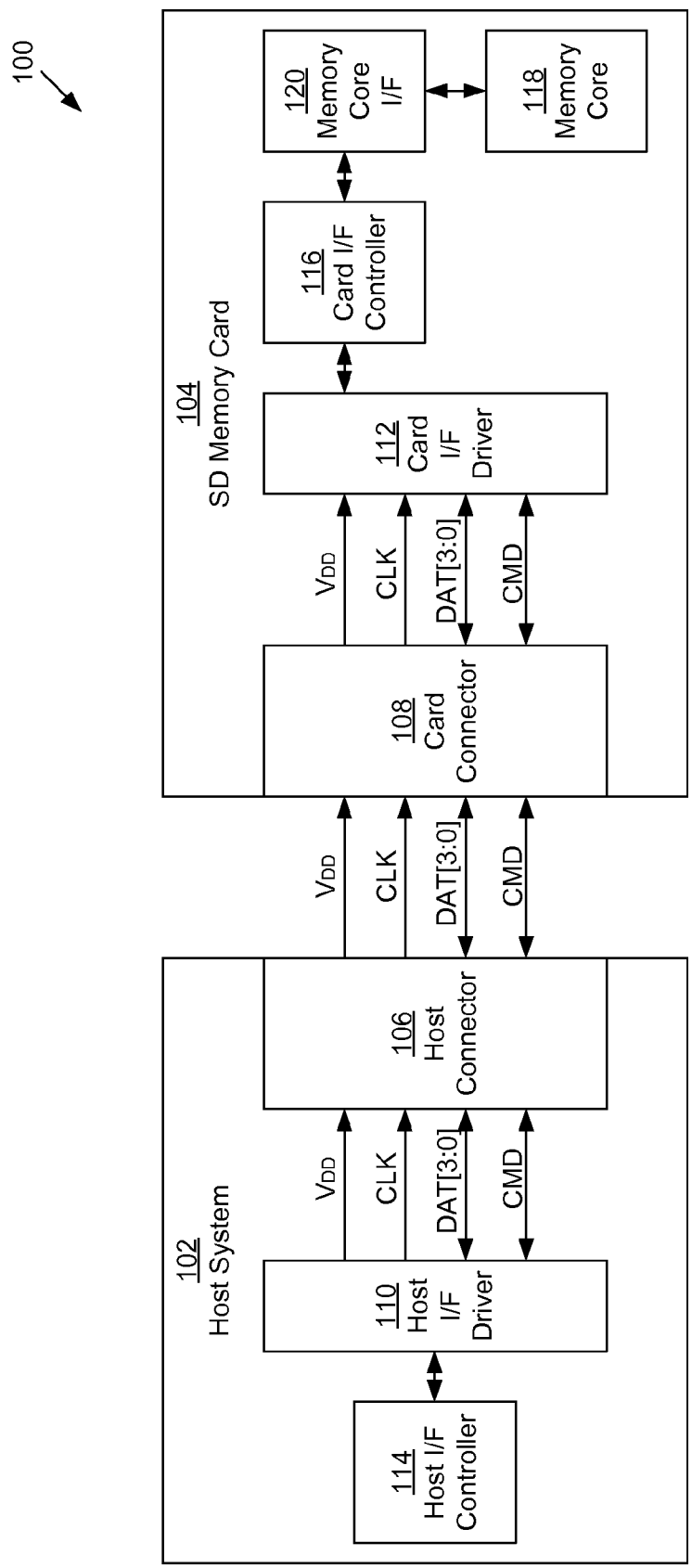
FIG. 1 is a block diagram of an example electronic system that includes a host system and a SD memory card.

By way of introduction, the below embodiments relate to low voltage detection and initialization. In one embodiment, a non-volatile memory system may include an input/output (I/O) driver circuit configured for communication with a host system via a communications bus, a regulator circuit configured to output a regulator output voltage to the input/output driver circuit, and a host detection circuit configured to detect a level of a host signal received on the communications bus and set the regulator circuit in a first mode or a second mode based on the detection. The regulator circuit may be configured to output a regulator output voltage at a first voltage level in the first mode and output the regulator output voltage at a second voltage level in the second mode.

In a second embodiment, a method of setting a regulator output voltage may include: with a non-volatile memory system, beginning an initialization process upon being connected with a host system, and switching, with a regulator circuit of the non-volatile memory system, a regulator output voltage from a first voltage level to a second voltage level before an input/output (I/O) driver circuit of the non-volatile memory system responds to a synchronization message received from the host system, where the synchronization message may be communicated to determine whether the non-volatile memory system and the host system are to communicate at the first voltage level or the second voltage level.

In a third embodiment, an electronic system may include a host system and a non-volatile memory system connected to the host system. The host system, upon being connected to the non-volatile memory system, may be configured to: provide a supply voltage at a first voltage level to the non-volatile memory system; send a host signal at a second voltage level to the non-volatile memory system, wherein the second voltage level is lower than the first voltage level; identify a triggering event associated with the host signal; and in response to identification of the triggering event, send an initial command at the second voltage level to the non-volatile memory system. The non-volatile memory system may include an input/output (I/O) driver circuit configured for communication with the host system, a regulator circuit configured to output a regulator output voltage to the I/O driver circuit, and detection circuitry configured to detect the host signal at the second voltage level, and in response to the detection, set the regulator circuit to output the regulator output voltage at the second voltage level.

In some embodiments, a host detection circuit may be configured to detect whether a level of a clock signal corresponds to the first voltage level or the second voltage level.

In some embodiments, the host signal may be communicated on at least one of a data line or a command line.

Other embodiments are possible, and each of the embodiments can be used alone or together in combination. Accordingly, various embodiments will now be described with reference to the attached drawings.

Exemplary Embodiments

As mentioned in the background section above, some host systems may initially communicate with a SD memory card at 3.3 V and then switch to a lower voltage, such as 1.8 V or 1.2 V after confirming that the SD memory card is capable of communicating at the lower voltage. Other host systems may initially communicate at the lower voltage. The following embodiments may allow a SD memory card to determine the voltage level at which the host system initially communicates and set its regulator output voltage accordingly so that the SD memory card may perform initialization with the host system, regardless of the voltage level at which the host system initially communicates.

FIG. 1 is block diagram of an electronic system 100 that includes a host system 102 and a Secure Digital (SD) memory card 104. The SD memory card 104 may be any memory card device or storage module that is configured to operate and/or have a form factor in accordance with and/or defined in a Secure Digital standard or specification. The host system 102 may be any electronic system or device that is configured to communicate and/or operate with the SD memory card 104.

Each of the host system 102 and the SD memory card 104 may include a respective connector 106, 108. The connectors 106, 108 may include the structural and/or physical components that allow the host system 102 and the SD memory card 104 to be connected to each other for communication. Example structural and/or physical components may include conductive components (such as conductive lines, traces, pins, leads, and/or pads as examples), and support structures (such as the packaging or housing used to support the conductive components and/or house and protect inner circuitry components of the respective host system 102 and the SD memory card 104. The connectors 106, 108 may be sized or otherwise configured to mate with each other. For some example configurations, the connectors 106, 108 may provide a removable connection between the host system 102 and the SD memory card 104. For other example configurations, particularly non-volatile memory systems other than SD cards, such as embedded non-volatile memory systems, the connectors 106, 108 may provide a non-removable or fixed connection between the host system 102 and the non-volatile memory system.

When the host and card connectors 106, 108 are connected to each other, a communications bus may be formed or established, on which the host system 102 and the SD memory card 104 may communicate signals with each other. The communications bus may include a power supply line $V_{DD}$ on which the host system 102 may supply a supply voltage to the SD memory card 104, clock line CLK on which the host system 102 may send a clock signal to the SD memory card 104; data lines DAT[3:0] on which the host system 102 and the SD memory card 104 may communicate data signals with each other; and a command line CMD on which the host system 102 and the SD memory card 104 may communicate command signals and responses with each other.

The supply voltage may provide power to the electronic circuit components of the SD memory card 104 so that the components may operate. The data signals may include data that the host system 102 wants stored in or read from the SD memory card 104, although other types of data may be possible. As indicated in FIG. 1, the data lines DAT[3:0] may include four lines (e.g., DAT0, DAT1, DAT2, DAT3). The host system 102 may utilize all or only some of the four data lines DAT[3:0] to send a data signal. Command signals sent from the host system 102 may instruct or request that the SD memory card 104 do some action, such as perform an operation, transition into a certain state, or respond with requested information, as examples. The response signals sent from the SD memory card 104 may acknowledge receipt of the response signal, indicate that the instructed/ action is performed, or include the requested information, as examples. The clock signal may set the frequency of the communications bus and/or control the data flow by providing the times and/or rates at which the clock and data signals may be sampled by the SD memory card 104.

Each of the host system 102 and the SD memory card 104 may also include a respective interface driver circuitry 110, 112. The interface driver circuitries 110, 112 may each be configured to generate, send, and/or receive signals on the communications bus. For some example configurations, as explained in further detail below, the interface driver circuitries may generate and/or send at least some of the signals by pulling up and pulling down the voltages on the lines of the communications bus.

Each of the interface driver circuitries 110, 112 may be configured to generate and communicate the clock, data, and command signals in at least one of a plurality of voltage domains. The plurality of voltage domains may include at least two voltage domains: a high voltage domain and a low voltage domain. For some example configurations, more than two voltage domains may be possible.

Each of the voltage domains may include a high predetermined voltage level and a low predetermined voltage level. Additionally, each of the voltage domains may include a high voltage range within which the high predetermined voltage level lies and a low voltage range within which the low predetermined voltage level lies. Each voltage range may include an upper bound (or maximum voltage) and a lower bound (or minimum voltage).

In general, the high predetermined voltage level of the high voltage domain may be higher than the high predetermined voltage level of the low voltage domain. In addition, the high voltage ranges of the high and low voltage domains may not overlap such that the lower bound of the high voltage range of the high voltage domain is higher than the upper bound of the high voltage range of the low voltage domain. Other high voltage relationships between the high and low voltage domains may be possible.

For a particular example configuration, for the high voltage domain, the high predetermined voltage may be 3.3 V and the low predetermined voltage may be 0 V. The upper and lower bounds of the high voltage range may be 3.6 V and 2.3 V, respectively. The upper and lower bounds of the low voltage range may be 0.825 V (or 0.25 times the supply voltage level) and −0.30 V, respectively. For the low voltage domain, the high predetermined voltage may be 1.8 V and the low predetermined voltage may be 0 V. The upper and lower bounds of the high voltage range may be 2.0 V and 1.27 V, respectively. The upper and lower bounds of the low voltage range may be 0.58 V and −0.30 V, respectively. These voltage levels are merely exemplary, and other levels for any of the voltages in one or both of the voltage domains may be possible. As an example, the high predetermined voltage for the low voltage domain may alternatively be 1.2 V and the high predetermined voltage for the high voltage domain may be either 1.8 V or 3.3 V.

As mentioned, the interface driver circuitries 110, 112 may be configured to generate and communicate the clock, data, and command signals in the high voltage domain, the low voltage domain, or both. As used herein for simplicity, and unless otherwise specified, a signal being generated and/or communicated in the high voltage domain or the low voltage domain may be synonymous and/or used interchangeably with a signal being generated and/or communicated at the high voltage level or the low voltage level, respectively. In other words, as used herein, a signal generated and/or communicated at the high voltage level may mean that the high level of the signal is at the high predetermined voltage level and/or within the upper voltage level of the high voltage domain. Likewise, a signal generated and/or communicated at the low voltage level may mean that the high level of the signal is at the high predetermined voltage level and/or within the upper voltage level of the low voltage domain.

Each of the host system 102 and the SD memory card 104 may also include a respective interface controller 114, 116. The interface controllers 114, 116 may determine and/or control the signals that the interface driver circuitries 110, 112 generate and/or send out on the communications bus. Additionally, the interface driver circuitries 110, 112 may communicate signals that they receive on the communications bus to their respective interface controllers 114, 116 for further processing. Each of the interface controllers 114, 116 may be implemented in hardware, such as analog and/or digital logic circuitry, although other configurations may include some combination of hardware and software.

As shown in FIG. 1, the SD memory card 104 may further include a memory core 118, which may include volatile memory, non-volatile memory, or a combination thereof. The SD memory card 104 may also include a memory core interface 120 that provides an interface between the card interface controller 116 and the memory core 118. The card interface controller 116 may be configured to communicate data and commands with the memory core 118 via the memory core interface 120 to store data in and/or read data from the memory core 118. Such communications may be performed in response to host commands, such as host read commands and host write commands received from the host system 102.

The SD memory card 104 may be configured to operate in two modes of operation—a data transfer mode and a card-identification mode. During the data transfer mode, the SD memory card 104 may be configured to store and/or retrieve data from the memory core 118, or otherwise transfer data to and from the host system 102. Before the SD memory card 104 may be configured in the data transfer mode, the SD memory card 104 may be configured in the card-identification mode, in which the host system 102 may communicate with the SD memory card to obtain an identification (ID), such as a relative card address (RCA), of the SD memory card 104.

Before or while the SD memory card 104 is in the card-identification mode, the SD memory card 104 and the host system 102 may perform an initialization process, during which the host system 102 may confirm that the SD memory 104 is able to operate at the supply voltage that the host system 102 is supplying to the SD memory card 104 via the power supply line $V_{DD}$, as well as confirm the voltage level of the signaling at which the host system 102 and the SD memory card 104 are to communicate on the communications bus.

The initialization process may begin when the host system 102 detects that the SD memory card 104 has become connected to it, such as when then the connector 108 of the SD memory card 104 mates with the connector 106 of the host system 102 to establish the communications bus. The host system 102 may be configured to detect a connection with the SD memory card 104 in various ways. In one way, the detection may be electrical-based in that the host system 102 may sense or detect a pull-up resistance on one or more of the data lines DAT[3:0] and/or the command line CMD, indicating the connection with the SD memory card 104. In another way, the detection may be mechanical-based (otherwise referred to as hot insertion), in that the connector 106 of the host system 102 may include a contact spring and mechanical switch. When the card connector 108 is mated with the host connector 106, the contact spring may move to a position that closes the mechanical switch. The host interface controller 114 may be configured to detect when the mechanical switch closes, and in turn determine that it is connected to the SD memory card 104. Other ways that the host system 102 may detect a connection with the SD memory card 104 may be possible.

After the host system 102 detects the SD memory card 104, a power supply of the host system 102 (not shown in FIG. 1) may begin supplying power to the host and card interface driver circuitries 110, 112. The power supply voltage may begin ramping up to a level within an operating supply voltage range corresponding to a predetermined supply voltage value. For some example configurations, the predetermined supply voltage value may be 3.3 V or a voltage level corresponding to the high predetermined voltage of the high voltage domain. A lower bound or minimum voltage of the operating supply voltage range may be about 2.7 V and an upper or maximum voltage of the operating supply voltage range may be about 3.6 V, although other lower and/or upper bounds for the operating supply voltage range may be possible.

After the supply voltage ramps up to a level within the operating supply voltage range, a voltage stabilization period (e.g., a time duration of about one millisecond (ms)) may follow. Upon expiration of the voltage stabilization period, the host interface driver circuitry 110 may begin sending a clock signal on the clock line CLK to the card interface driver circuitry 112. For some example configurations, the clock signal may be sent at the high voltage level, and for other example configurations, the clock signal may be sent at the low voltage level. In addition, an example frequency of the clock signal that is output during the initialization process may be in a range of about 100 kilohertz (kHz) to 500 kHz, although other clock frequencies may be possible.

As part of the initialization process, the host interface controller 114 may be configured to determine whether to send command signals on the command line CMD to the SD memory card 104 to confirm that the SD memory 104 is able to operate at the supply voltage that the host system 102 is supplying to the SD memory card 104, as well as determine whether the host system 102 and the SD memory card 104 are to communicate on the communications bus at the high voltage level or the low voltage level. Under the SD specification, the command signals may include: an initial, reset command (CMD0) that instructs the SD memory card 104 to enter a reset state, a supply voltage confirmation request command (CMD8) that requests that the SD memory card 104 supports the supply voltage supplied on the power supply line $V_{DD}$, and a synchronization command (ACMD41) that is sent to negotiate the voltage level at which the signals are sent. An example sequence for sending the commands may include sending the reset command (CMD0) first, and then the supply voltage confirmation request command (CMD8), and then the synchronization command (ACMD41). For some example configurations, the conditions for sending each of the commands may be that if the host interface controller 114 determines to send the reset command (CMD0), then the host interface controller 114 may also determine to send the supply voltage confirmation request command (CMD8). If the host system 102 receives a valid response to the supply voltage confirmation request (CMD8) (i.e., the SD memory card 104 confirms that it supports the level of the supply voltage), then the host interface controller 114 may determine to send the synchronization command (ACMD41).

The host interface controller 114 may be configured to determine to send the reset command (CMD0) in response to identification of a triggering event. For some example configurations, the triggering event may be an expiration of a time period during which the host interface driver circuitry 110 initially sends the clock signal. The time period may be measured in units of time (e.g., microseconds (us)) and/or a number of clock cycles. When the units of time or the number of clock cycles as reached a threshold number, then time period may expire, at which point the host interface controller 114 may determine to send the reset command (CMD0).

The duration of the time period and/or the time at which the time period expires may fall within a range defined by a minimum duration and a maximum duration. For some example configurations, the minimum duration, identified in terms of a number of clock cycles and/or in units of time, may depend on whether the clock signal is sent at the high voltage level or the low voltage level. In particular, if the clock signal is sent at the high voltage level, then the minimum duration may be 60 clock cycles or 150 microseconds. Alternatively, if the clock signal is sent at the low voltage level, then the minimum duration may be greater than 60 clock cycles and/or greater than 150 microseconds. In one example embodiment, the minimum duration may be 100 clock cycles and/or 250 microseconds. As explained in further detail below, the minimum duration may be longer for when the host system 102 sends the clock signal at the lower voltage level than the higher voltage level in order to provide extra time for the card interface driver circuitry 112 to detect the clock signal at the lower voltage level and switch a level of a regulator output voltage. Additionally, for either situation, the maximum duration may be about 1 millisecond.

Also, an initialization clock frequency of the clock signal may be set to a frequency that is within a predetermined frequency range. An example frequency range may be from 100 kiloHertz (kHz) to 500 kHz, although other frequency ranges are possible. For some example configurations, the minimum duration, in terms of the number of clock signals and/or units of time, may vary depending on the frequency of the clock signal. In one example, the minimum durations identified above may correspond to clock frequencies of 400 kHz or above. These minimum durations may increase inversely proportional to decreases in clock frequency from 400 kHz such that a host system that communicates at a clock frequency lower than 400 kHz may be configured with a minimum duration that is longer than a minimum duration for a host system that communicates at a clock frequency of 400 kHz or above. That is, host systems that initially communicate at the high voltage level at a clock frequency lower than 400 kHz may have a minimum duration that is greater than 150 microseconds at 60 clock cycles, and host systems that initially communicate at the low voltage level at a clock frequency lower than 400 kHz may have a minimum duration that is greater than 250 microseconds at 100 clock cycles. At the same time, the maximum duration of one millisecond may be the same or constant, regardless of the clock frequency at which the host system communicates. Other configurations for setting the minimum and/or maximum durations may be possible.

For other example configurations, the triggering event may be a response signal received from the SD memory card 104 rather than expiration of a time period. If the host system 102 receives the response signal within a predetermined period of time, then the host interface controller 114 may determine to send the reset command (CMD0). For some example configurations, the response signal may be a response to the clock signal, indicating that the SD memory card 104 has detected the clock signal at the lower voltage level. For other example configurations, the response signal may be a response to a host signal, independent of or other than the clock signal, that the host interface driver circuitry 110 sends on at least one of the data lines DAT[3:0] and the command line CMD.

The card interface controller 116 may be configured to send the response signal by changing the voltage level of at least one of the data lines DAT[3:0] or the command line CMD. How the card interface controller 116 responds may depend on how the host interface controller 114 initially sets the voltage levels of the data lines DAT[3:0] and the command line CMD. For example, when the response signal is a response to detection of the clock signal at the lower voltage level, the host interface controller 114 may be configured to initially pull down the voltage level of at least one of the data lines DAT[3:0] or the command line CMD when sending the clock signal. When the SD memory card 104 detects the clock signal at the lower voltage level, the SD memory card 104 may send the response signal by pulling up the voltage level of one of the data lines DAT[3:0] and/or the command line CMD that the host system 102 pulled down. Alternatively, when initially sending the clock signal, the host interface controller 114 may not pull down any of the data or command lines DAT[3:0], CMD, and the card interface controller 116 may notify the host interface controller 114 that it detected the clock signal at the lower voltage level by pulling down at least one of the data line DAT[3:0] or the command line CMD.

Additionally, for example configurations where the response signal is a response to a host signal other than the clock signal, the host system 102 may send the host signal by initially pulling down at least one of the data lines DAT[3:0] or the command line CMD. Upon detecting that one of the data lines DAT[3:0] or the command line CMD has been pulled down by the host system 102, the card interface controller 116 may send the response signal by pulling back up the one or more data lines DAT[3:0] and/or the command line CMD that the host system 102 initially pulled down.

In addition, for some example configurations, the host interface controller 114 may determine whether to send the reset command (CMD0) based on a response from the SD memory card 104 when the host interface driver circuitry 110 is configured to send the clock signals and the initial command signals (i.e, CMD0, CMD8, and ACMD41) during initialization at the lower voltage level, but not for when the host interface driver circuitry 110 sends them at the higher voltage level. That is, when the host driver circuitry 110 is configured to the send the clock signal and initial command signals CMD0, CMD8 and ACMD41 at the high voltage level, the determination of whether to send the reset command (CMD0) may be made when the time period during which the host system 102 initially sends the clock signal expires. Alternatively, when the host driver circuitry 110 is configured to send the clock signal and the initial command signals CMD0, CMD8, and ACMD41 at the low voltage level, the host interface controller 110 may be configured to determine to send the reset command (CMD0) in response to: expiration of the time period, receipt of a response to the clock signal sent at the lower voltage level, or receipt of a response to a host signal sent on at least one of the data lines DAT[3:0] or the clock line CLK. Other configurations for determining whether to send the reset command (CMD0) may be possible. For example, even if the host interface driver circuitry 110 sends the clock signal and the initial command signals CMD0, CMD8, and ACMD41 at the higher voltage level, the host interface controller 114 may be configured to determine to send the reset command (CMD0) in response to receipt of a response from the SD memory card 104 rather than in response to expiration of the time period.

Additionally, a similar scheme may be implemented for example configurations where the host interface driver circuitry 110 does not send the reset command CMD0. That is, if the host interface driver circuitry 110 does not send the reset command (CMD0) and the first command that the host interface driver circuitry 110 sends is configured to send is the supply voltage confirmation request command (CMD8), then whether to send the supply voltage confirmation request command (CMD8) may be determined by the host interface controller 110 in the same way as it would determine whether to send the reset command (CMD0) as previously described.

As previously described, if the host interface driver circuitry 110 sends the reset command (CMD0), the host interface driver circuitry 110 may also send the supply voltage confirmation request command (CMD8). Upon receipt of the supply voltage confirmation request command (CMD8), the card interface controller 116 may determine whether SD memory card 104 supports the level of the power supply voltage. If the SD memory card 104 does, then the card interface driver circuitry 112 may send a valid response on the command line CMD back to the host interface drier circuitry 110, indicating that the SD memory card 104 supports the level of the power supply voltage.

In response to receipt of the valid response, the host interface controller 114 may determine to have the host interface driver circuitry 110 send the synchronization command (ACMD41) to the card interface driver circuitry 112. FIG. 2 to FIG. 5 show schematic diagrams of example synchronization commands and responses to the synchronization commands. In particular, FIG. 2 shows a schematic diagram of an example synchronization command (ACMD41) 200 that the host system 102 may generate and send when the host interface driver circuitry 110 is configured to send the clock signal and the initial commands CMD0, CMD8, ACMD41 at the high voltage level; FIG. 3 shows a schematic diagram of an example response (R3) 300 to the synchronization command (ACMD41) of FIG. 2; FIG. 4 shows a schematic diagram of another example synchronization command (ACMD41) 400 that the host system 102 may generate and send when the host interface driver circuitry 110 is configured to send the clock signal and the initial command CMD0, CMD8, ACMD41 at the low voltage level; and FIG. 4 shows a schematic diagram of an example response (R3) 500 to the synchronization command (ACMD41) shown in FIG. 4.

Referring to FIG. 2, moving from left to right, the example synchronization command (ACMD41) 200 may include a start field (S) that contains a start bit, a direction field (D) that contains a direction bit indicating that the command is being sent from the host system 102 to the SD memory card 104, and an index field (Index) containing a value indicating the index for the synchronization command (ACMD41). Additionally, the synchronization command (ACMD41) 200 may include a busy field (Busy) that contains a value indicating whether the host system 102 is busy during initialization. For some example configurations, the value in the busy field may always indicate that the host system 102 is not busy.

The synchronization command (ACMD41) may also include a host capacity field (HCS) containing a value that indicates one or more capacity or types of SD cards that the host system 102 supports. Capacities or types may include Secure Digital Standard Capacity (SDSC), Secure Digital High Capacity (SDHC), and Secure Digital eXtended Capacity (SDXC), although other capacities or types, either currently or later developed, may be possible. In addition, the synchronization command (ACMD41) 200 may include a power performance field (XPC) containing a value indicating a power performance mode of the host system 102 (e.g., power saving or maximum performance).

Further, the synchronization command (ACMD41) 200 may include a signaling level field (518R) containing a value indicating whether the host system 102 would like to communicate with the SD memory card 104 at the high voltage level or the low voltage level. Since the host system 102 is already communicating with the SD memory card 104 at the high voltage level, then the value included in the signaling level field (S18R) may be an indication whether the host system 102 would like to continue communicating at the high voltage level or switch to the low voltage level for subsequent communication.

The synchronization command (ACMD41) 200 may also include one or more supported voltage fields (OCR) containing one or more values indicating the operating supply voltage range or the supply voltage profile supported by the host system 102. In addition, the synchronization command (ACMD41) 200 may include a cyclic redundancy check (CRC) field (CRC7) containing code used for a cyclic redundancy check. Lastly, the synchronization command (ACMD41) 200 may include an end field (E) containing an end bit.

Referring to FIG. 3, moving from left to right, the response 300 to the synchronization command (ACMD41) 200 shown in FIG. 2 may similarly include a start field (S) that contains a start bit, a direction field (D) that contains a direction bit indicating that the response (R3) 300 is being sent from the SD memory card 104 to the host system 102, and an index field (Index) containing a value indicating an index of the response (R3) 300. Additionally, the response (R3) 300 may include a busy field (Busy) that contains a value indicating whether the SD memory card 104 is busy during initialization. For some example configurations, SD memory card 104 may send multiple responses (R3) 300 periodically while the initialization process is ongoing. The busy field for these responses may indicate that the SD memory card 104 is busy. When the initialization process is complete, the SD memory card 104 may send a response (R3) with the busy field containing a value that indicates that the SD memory card 104 is not busy.

The response (R3) 300 may also include a card capacity field (CCS) containing a value that indicates the capacity or type of the SD memory card 104. Also, the response (R3) 300 may include an Ultra High Speed II field (UHS-II) containing a value that indicates whether the SD memory card 104 is a UHS-II card.

In addition, the response (R3) 300 may include a signaling level field (S18A) containing a value indicating whether the SD memory card 104 wants to communicate at the high voltage level or the low voltage level. Since the SD memory card 104 is already communicating with the host system 102 at the high voltage level, then the value included in the signaling level field (S18A) may indicate whether the SD memory card 104 wants to continue communicating at the high voltage level or switch to the low voltage level for subsequent communication.

The response (R3) 300 may also include one or more supported voltage fields (OCR) containing one or more values indicating the operating supply voltage range or the supply voltage profile supported by the SD memory card 104. In addition, the response (R3) 300 may include a cyclic redundancy check (CRC) field (CRC7) containing code used for a cyclic redundancy check. Lastly, the response 300 may include an end field (E) containing an end bit.

During initialization, when the host interface driver 110 sends the synchronization command (ACMD41) 200 with the value in the signaling level field (S18R) indicating that the host system 102 wants to switch to the low voltage level, and the SD memory card 404 sends the response (R3) with the value in the signaling level field (S18A) indicating that the SD memory card 104 also wants to switch to the low voltage level, the host system 102 may respond by sending a switch execution command (CMD11) to the SD memory card 104 that instructs the SD memory card 104 to switch to the low voltage level.

Referring to FIG. 4, the example alternative synchronization command (ACMD41) 400 may be similar to the synchronization command (ACMD41) shown in FIG. 2, except that the alternative synchronization command (ACMD41) 700 may also include a low voltage host field (LVH) that contains a value indicating whether the host system 102 sends the clock signal and the initial commands CMD0, CMD8, ACMD41 at the high voltage level or the low voltage level. As previously described, the value in the signaling level field S18R may indicate to the SD memory card 104 whether to switch voltage levels. However, if the host system 102 and the SD memory card 104 are already communicating at the low voltage level, then switching to the low voltage level is not necessary. Accordingly, the signaling level field S18R may be set to a value to indicate to the SD memory card 104 not to switch voltage levels. The additional low voltage host field (LVH) may be included in the alternative synchronization command (ACMD41) to indicate to the SD memory card 104 that the host system 102 does not want to switch because they are already communicating signals at the low voltage level. Conversely, if the host system 102 is configured to communicate the clock signal and the initial commands CMD0, CMD8, ACMD41 at the high voltage level, then the value in the low voltage host field (LVH) may be set to a value to indicate as such.

Referring to FIG. 5, the response (R3) 500 to the alternative synchronization command (ACMD41) may be similar to the response (R3) 300 shown in FIG. 3, except that that the alternative response (R3) 500 in FIG. 5 may also include a low voltage card field (LVC) that contains a value indicating whether the SD memory card 104 is already configured to communicate at the low voltage level. If the SD memory card 104 is already configured to communicate at the low voltage level, then the card interface driver circuitry 112 may output the response (R3) 500 such that the signaling level field (S18A) contains a value that indicates that the SD memory card 104 does not want to switch, and the value in the low voltage card field (LVC) indicates that the SD memory card 104 is already configured to communicate at the low voltage level.

In response to receipt of the response (R3) 500, the host interface controller 114 may check the signaling level field (S18A) and the low voltage card field (LVC). If the value in the signaling level field (S18A) indicates that the SD memory card 104 does not want to switch to communicating at the low voltage level, and the value in the low voltage card field (LVC) indicates that the SD memory card 104 is already configured to communicate at the low voltage level, then the host interface controller 114 may determine not to send a switch execution command (CMD11) to the SD memory card 104. If by chance, however, the host system 102 still sends the switch execution command (CMD11), the card interface controller 116 may be configured to ignore the command. Conversely, if the value in the signaling level field (S18A) indicates that the SD memory card 104 wants to switch to communicating at the low voltage level, and the value in the low voltage card field (LVC) indicates that the SD memory card 104 is not already configured to communicate at the low voltage level, then the host interface controller 114 may determine to send the switch execution command (CMD11) to the SD memory card 104.

Initialization may be considered complete when the host system 102 and the SD memory card 104 have agreed on the voltage level at which to communicate and each are configured to communicate at that voltage level. Additionally, from the perspective of the SD memory card 104, initialization may be complete upon sending a last response (R3) to the synchronization message (ACMD41) with the busy field indicating that the SD memory card 104 is not busy. From the perspective of the host system 102, initialization may be complete when the host interface controller 114 sends a switch execution command (CMD11) to the SD memory card 104 or determines not to send the switch execution command (CMD11) based on the values in the signaling level field (S18A) and the low voltage card field (LVC).

Figure 6:
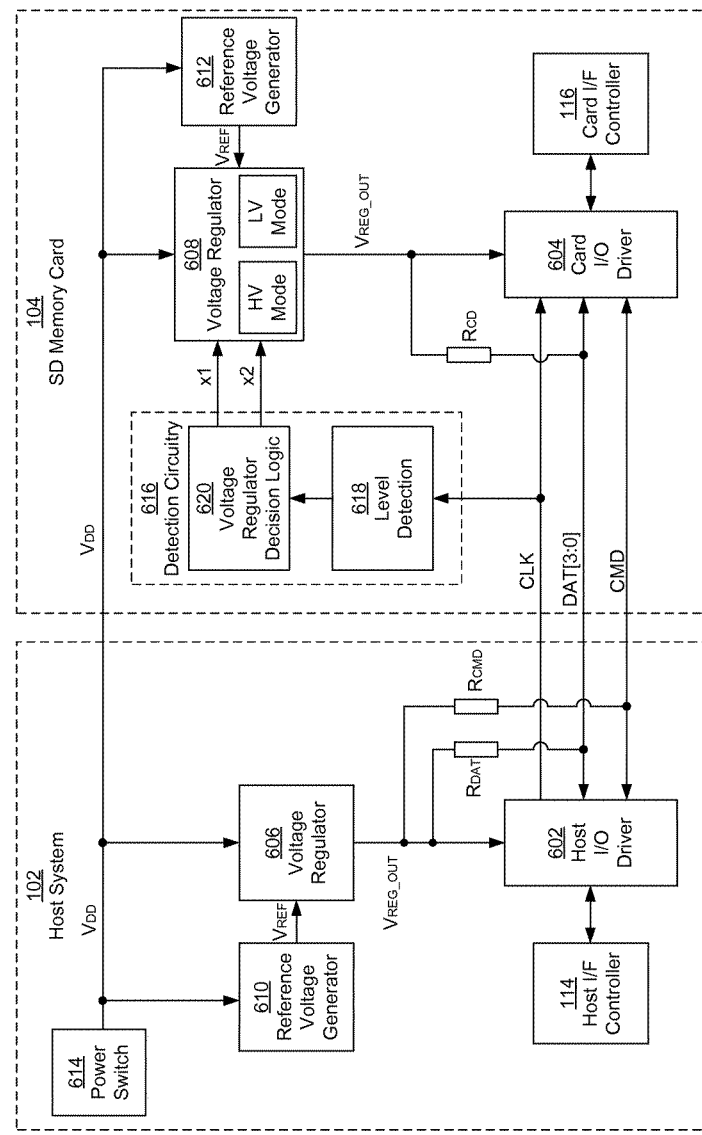
FIG. 6 is a block diagram of an example configuration of electronic components of the host system and the SD memory card of FIG. 1 used to perform an initialization process.

FIG. 6 shows a block diagram of an example configuration of electronic components of the host system 102 and the SD memory card 104 that may be used during initialization. Except for the host and card interface controllers 114, 116, the electronic components shown in FIG. 6 may be part of the host and card interface driver circuitries 110, 112. In addition or alternatively, the components shown in FIG. 6 may be part of respective physical layer (PHY) interfaces of the host system 102 and the SD memory card 104.

As shown in FIG. 6, each of the host system 102 and the SD memory card 104 may include a respective input/output (I/O) driver circuit 602, 604 (otherwise referred to as a multi-drive I/O circuit or an I/O buffer circuit) in communication with the clock line CLK, the data lines DAT[3:0], and the command line CMD of the communications bus. The host I/O driver circuit 602 may be configured to send and the card I/O driver circuit 604 may be configured to receive a clock signal on the clock line CLK. Additionally, the host and card I/O driver circuits 602, 604 may be configured to send and receive data, commands, and responses, on the data and command lines DAT[3:0], CMD.

Each of the I/O driver circuits 602, 604 may be configured to send signals by driving high and low (or pulling up and down) the voltage levels on the lines. Additionally, each of the I/O driver circuits 602, 604 may be configured to receive signals by detecting the levels being driven high and low (or being pulled up and down). Various circuit configurations for the host and card I/O driver circuits 602, 604 may be possible. An example buffer circuit configuration may include some combination of buffer circuitry, Schmitt-triggers, and multiplexer circuits, although other circuit configurations may be possible.

In addition, as shown in FIG. 6, each of the I/O driver circuits 602, 604 may be in communication with a respective interface controller 114, 116. The interface controllers 114, 116 may determine and/or control at least some of the signaling that the I/O driver circuits 602, 604 send out on the lines. Additionally, the signals that the I/O driver circuits 602, 604 receive on the lines may be communicated to their respective interface controllers 114, 116 for further processing.

The host system 102 and the SD memory card 104 may each further include a voltage regulator circuit 606, 608 configured to generate and output a regulator output voltage $V_{REG\_OUT}$ to a respective I/O driver circuit 602, 604. The voltage level at which the I/O driver circuits 602, 604 send signals on the clock, data, and command lines CLK, DAT [3:0], CMD of the communications bus may correspond to and/or match the voltage level of the regulator output voltage $V_{REG\_OUT}$ that they each receive. For example, when sending the signals or driving the level of a line high, the I/O driver circuits 602, 604 may each be configured to clamp to the level of the regulator output voltage $V_{REG\_OUT}$ it is receiving. As such, the level of the regulator output voltage $V_{REG\_OUT}$ may be set to the output voltage level at which the I/O driver circuits are to output the signals on the communications bus. Similarly, the level of the regulator output voltage $V_{REG\_OUT}$ may correspond to and/or match the voltage level of the signals that the I/O driver circuits 602, 604 receive in order for the I/O driver circuits 602, 604 to successfully receive the signals and communicate them to their respective I/O interface controllers 114, 116.

Depending on the configuration of the host system 102, the host voltage regulator circuit 606 may be configured to alternatingly output its regulator output voltage $V_{REG\_OUT}$ at the high voltage level and the low voltage level, only at the high voltage level, or only at the low voltage level. So that the SD memory card 104 may be compatible with any of the configurations of the host system 102, the card voltage regulator circuit 608 may be configured to alternatingly output its regulator output voltage $V_{REG\_OUT}$ at the high voltage level and the low voltage level. As shown in FIG. 6, the card voltage regulator circuit 608 may be operable in and/or configured to switch between a high voltage (HV) mode and a low voltage (LV) mode to output its regulator output voltage $V_{REG\_OUT}$ at the high voltage level and the low voltage level, respectively.

As shown in FIG. 6, each of the voltage regulator circuits 606, 608 may be powered by the power supply voltage supplied on the power supply line $V_{DD}$. Additionally, each of the regulator circuits 606, 608 may be configured to receive a reference voltage $V_{REF}$ supplied by a respective reference voltage generator circuit 610, 612, each of which may also be powered by the power supply voltage from the power supply line $V_{DD}$. The reference voltages $V_{REF}$ may be used to calibrate and/or tune the voltage regulator circuits 610, 612 and/or the voltage levels of the regulator output voltages $V_{REG\_OUT}$. Further, as shown in FIG. 6, the host system 102 may include a power switch or switching circuitry 614 to control output of the power supply voltage on the power supply line $V_{DD}$.

When the SD memory card 104 becomes connected to the host system 102, the host system 102 may begin supplying the power supply voltage on the power supply line $V_{DD}$ to the card voltage regulator circuit 608. As an initial or default configuration, the card voltage regulator circuit 608 may be in the high voltage mode and output its regulator output voltage $V_{REG\_OUT}$ at the high voltage level to the card I/O driver circuit 604. In turn, the card I/O driver circuit 604 may be configured to send and receive signals on the communications bus at the high voltage level.

For configurations of the host system 102 where the host voltage regulator circuit 606 is configured to only or at least initially output its regulator output voltage $V_{REG\_OUT}$ at the low voltage level such that the host I/O driver circuit 602 is configured to initially output signals on the clock, data, and command lines CLK, DAT[3:0], CMD at the low voltage level, there may be an initial mismatch in voltage level between the voltage level at which the host I/O driver circuit 602 is configured to communicate on the communications bus and the voltage level at which the card I/O driver circuit 604 is configured to communicate on the communications bus. Should the mismatch be present when the host I/O driver circuit 604 begins sending the clock signal and the initial commands CMD0, CMD8, and ACMD41, the card I/O driver circuit 604 and/or the card interface controller 116 may be unable to successfully receive and/or respond to the clock and/or initial command signals. Accordingly, it may be desirable for the card regulator circuit 608 to switch from the high voltage mode to the low voltage mode to output its regulator output voltage at the low voltage level as soon as possible during initialization, and in any event, before the card I/O driver circuit 604 receives at least one of the initial command signals CMD0, CMD8, or ACMD41.

As shown in FIG. 6, the SD memory card 104 may further include detection circuitry 616 coupled to the clock line CLK of the communications bus. The detection circuitry 616 may be configured to detect whether the clock signal is being sent from the host system 102 at the high voltage level or the low voltage level. In response to the detection, the detection circuitry 616 may be configured to output a regulator control signal to the card regulator circuit 608 that either switches the card voltage regulator circuit 608 from the high voltage mode to the low voltage mode, or maintains the card voltage regulator circuit 608 in the high voltage mode. In particular, if the detection circuitry 616 detects that the clock signal is sent at the low voltage level, then the detection circuitry 616 may generate and output the regulator control signal in a way that causes the card voltage regulator circuit 608 to switch to the low voltage mode. Alternatively, if the detection circuitry 616 detects that the clock signal is sent at the high voltage level, then the detection circuitry 616 may generate and output the regulator control signal in a way that causes the card voltage regulator circuit 608 to stay in the high voltage mode.

The detection circuitry 616 may include level detection circuitry 618 and voltage regulator decision logic circuit 620. The level detection circuitry 618 may be configured to receive the clock signal, detect or measure the high level of the clock signal, and provide a level indication signal to the voltage regulator decision logic circuit 620 of whether the clock signal is being sent at the high voltage level or the low voltage level. The level detection circuitry 618 may be configured in various ways. For example, the level detection circuitry 618 may include analog clock detection circuitry.

In addition or alternatively, the level detection circuitry 618 may include two level detection circuits—one to detect whether the high level of the clock signal reaches the low voltage level, and another to detect whether the high level of the clock signal reaches the high voltage level. The level indication signal provided by the level detection circuitry 618 may indicate whether the high level of the clock signal has reached neither the low or high voltage levels, only the low voltage level, or both the low voltage level and the high voltage level.

Based on the level indication signal received from the level detection circuitry 618, the voltage regulator decision logic circuit 620 may be configured to identify the voltage level of the clock signal and in turn output the regulator control signal to configure the card voltage regulator circuit 608 in the high voltage mode or the low voltage mode, as desired. In particular, if the level indication signal indicates that the clock signal has reached neither the low voltage level or the high voltage level, then the voltage regulator decision logic circuit 620 may determine that no clock signal is being sent on the clock line CLK, and in turn output the regulator control signal (or refrain from outputting the regulator control signal) such that the card voltage regulator circuit 608 is maintained in the high voltage mode. Alternatively, if the level indication signal indicates that the clock signal has reached the low voltage level but not the high voltage level, then the voltage regulator decision logic circuit 620 may determine that the clock signal is being sent at the low voltage level, and in turn, output the regulator control signal such that the card voltage regulator circuit 608 switches from the high voltage mode to the low voltage mode. Still alternatively, if the level indication signal indicates that the clock signal has reached both the low voltage level and the high voltage level, then the voltage regulator decision logic circuit 620 may determine that the clock signal is being sent at the high voltage level, and in turn output the regulator control signal (or refrain from outputting the regulator control signal) such that the card voltage regulator circuit 608 is maintained in the high voltage mode.

The regulator control signal may be generated and output in various ways to set the card voltage regulator circuit 608 in either the high voltage or the low voltage mode. FIG. 6 shows that the voltage regulator decision logic circuit 620 may be configured to output the regulator control signal as a two-bit signal comprising a first bit x1 and a second bit x2. In one example configuration, the voltage regulator decision logic circuit 620 may be configured to set the both first bit x1 and the second bit x2 low (or logic "0") to indicate that no clock signal is detected, which in turn may cause the card voltage regulator circuit 608 to be maintained in its current mode of operation. In addition, the voltage regulator decision logic 620 may be configured to set the first bit x1 high (or logic "1") and the second bit x2 low to indicate a detection of the clock signal at the low voltage level, which in turn may cause the card voltage regulator circuit 608 to be configured in the low voltage mode. Further, the voltage regulator decision logic circuit 620 may be configured to set the first bit x1 high and the second bit x2 high to indicate a detection of the clock signal at the high voltage level, which in turn may cause the card voltage regulator circuit 608 to be configured in the high voltage mode. Various other ways of generating the regulator control signal and/or setting the first and second bits x1, x2 to configure the card voltage regulator circuit 608 in a desired mode may be possible.

As previously described, for some example configurations, the host system 102 may be configured to send the reset command signal (CMD0) in response to receipt of a response signal received from the SD memory card 104. With reference to FIG. 6, the card I/O driver circuit 604 may send a response signal in response to detection of the clock signal being sent at the low voltage level. For example, the detection circuitry 616 may detect that the host I/O driver is sending a clock signal on the clock line CLK at the low voltage level, and in response, output a regulator control signal that sets the card voltage regulator circuit 608 in the low voltage mode. The card I/O driver circuit 604 and/or the card interface controller 116 may detect that the voltage level of the regulator output voltage $V_{REG\_OUT}$ has switched from the high level to the low level. In response to the detection, the card I/O driver circuit 604 may send a response signal back to the host I/O driver 602 on the communications bus. In response to receipt of the response signal, the host interface controller 114 may determine that the SD memory card 104 is configured to communicate at the low voltage level, and in response, send the reset command signal (CMD0) at the low voltage level on the command line CMD.

The card I/O driver circuit 604 may be configured to send the response signal in various ways. In one example, the card I/O driver circuit 604 may do so by driving low at least one of the data lines DAT[3:0], the command line CMD, or a combination thereof. As shown in FIG. 6, on the host side, at least some of the data lines DAT[3:0] may be coupled to the output of the host voltage regulator circuit 606 via data line pull-up resistor circuitry $R_{DAT}$, and the command line CMD may be coupled to the output of the host voltage regulator circuit 606 via command line pull-up resistor circuitry $R_{CMD}$. The pull-up resistor circuitries $R_{DAT}$ and $R_{CMD}$ may protect the data and command lines DAT[3:0], CMD against bus floating when the SD memory card 104 is not connected to the host system 102. In addition, on the card side, one of the data lines DAT[3:0] may be coupled to the output of the card voltage regulator circuit 608 via card detect pull-up resistor circuitry $R_{CD}$. The pull-up resistor circuitry $R_{CD}$ may provide the resistance that the host system 102 senses to detect that it is connected to the SD memory card 104. When each of the host and card voltage regulator circuits 606, 608 are outputting their respective regulator output voltages $V_{REG\_OUT}$, each of the data lines DAT[3:0] and the command line CMD may be pulled up to a high voltage. As such, to send a response to the host system 102 indicating that the SD memory card 104 has detected the clock signal at the low voltage level, the card I/O driver circuit 604 may drive low at least one of the data lines DAT[3:0], the command line CMD, or a combination thereof. In one example configuration, the response signal may be a two-bit signal in that the card I/O driver circuit 604 may be configured to drive low one of the data lines DAT[3:0] and the command line CMD. Other ways of driving low the data lines DAT[3:0] and the command line to send the response signal may be possible. Alternatively, for configurations where the host system 102 sends the clock signal at the high voltage level, the SD memory card 104 may not respond, such as by keeping each of the data lines DAT[3:0] and the command line CMD pulled up to high levels.

Figure 7:
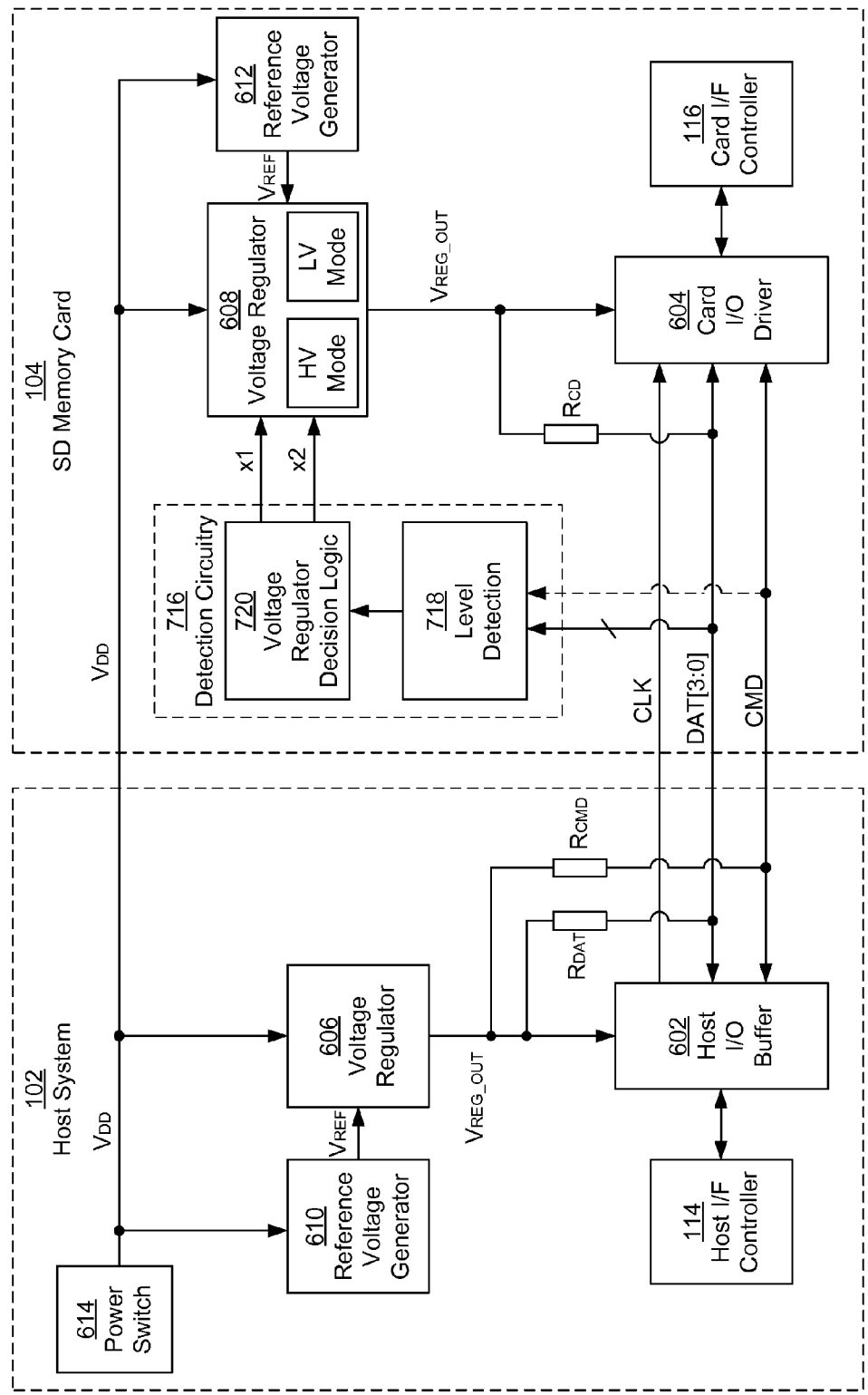
FIG. 7 is a block diagram of another example configuration of electronic components of the host system and the SD memory card of FIG. 1 used to perform an initialization process.

FIG. 7 shows a block diagram of another example configuration of electronic components of the host system 102 and the SD memory card 104 that may be used during initialization. The configuration shown in FIG. 7 may be similar to the configuration shown in FIG. 6, except that instead of having detection circuitry coupled to the clock line CLK as in the configuration shown in FIG. 6, the SD memory card 104 may have detection circuitry 716 coupled to at least one of the data lines DAT[3:0] and/or the command line CMD to detect whether the host is configured to communicate the clock signal and the initial command signals CMD0, CMD8, and ACMD41 at the low voltage level or the high voltage level. In FIG. 7, a "slash" is included across the arrow coupling level detection circuitry 718 to indicate that the level detection circuitry 718 may be coupled with and configured to detect the voltage level of only one or alternatively more than one of the data lines DAT[3:0]. The arrow coupling the level detection circuitry 718 with the command line CMD is shown as a dotted arrow to indicate that the coupling of the level detection circuitry 718 to the command line CMD may be made as an alternative or in addition to the coupling of the level detection circuitry 718 to one or more of the data lines DAT[3:0].

The level detection circuitry 718 may be configured to detect the voltage levels of the lines to which it is coupled, and based on the detected voltage levels, provide a level indication signal to voltage regulator decision logic circuitry 720 to indicate whether the host system is configured to communicate the clock signals and the initial command signals CMD0, CMD8, ACMD41 at the low voltage level or the high voltage level. In turn, the voltage regulator decision logic circuitry 720 may output a regulator control signal to the card voltage regulator circuit 608 to configure the card voltage regulator circuit 608 in the low voltage mode or the high voltage mode. For some example configurations, the regulator control signal may be a two-bit signal comprising a first bit x1 and a second bit x2, similar to the regulator control signal output by the voltage regulator decision logic circuitry 620 of FIG. 6, although other configurations may be possible.

The level detection circuitry 718 and the voltage regulator decision logic circuitry 720 may be configured to detect whether the host system 102 is configured to communicate the clock signal and the initial command signals CMD0, CMD8, and ACMD41 at the low voltage level or the high voltage level in various ways, depending on how the level detection circuitry 718 is coupled to the data lines DAT[3:0] and/or the command line CMD. For some example configurations, the detection may be based on a detection of the voltage level of one or more of the data lines DAT[3:0] and/or the command line CMD when the lines are initially pulled up. In addition or alternatively, the detection may be based on detecting a transition of at least one of the lines to a low voltage level.

In further detail, at least some of the data lines DAT[3:0] and the command line CMD may be pulled up via pull up resistor circuitry $R_{DAT}$ and $R_{CMD}$ once the host voltage regulator circuitry 606 begins outputting its regulator output voltage $V_{REG\_OUT}$, as previously described. The host voltage regulator circuit 606 may be configured to output the regulator output voltage $V_{REG\_OUT}$ at the voltage level at which the host I/O driver circuit 602 is to communicate the clock signal and the initial command signals CMD0, CMD8, ACMD41. As such, the voltage level of the data lines DAT[3:0] and the command line CMD when pulled up may correspond to the voltage level at which the host I/O driver circuit 602 is configured to output the clock signal and the initial command signals CMD0, CMD8, ACMD41. The level detection circuitry 718 may be configured to detect this voltage level, and provide the level indication signal to the voltage regulator decision logic 720 to indicate the detected voltage level. In turn, the voltage regulator decision logic 720 may be configured to determine whether the host system 102 is configured to communicate the clock signal and the initial command signals CMD0, CMD8, ACMD41 at the high voltage level or the low voltage level, and output the regulator control signal accordingly.

Alternatively, the level detection circuitry 718 may be configured to detect a low transition on at least one of the data lines DAT[3:0] and/or the command line CMD to which it is coupled to determine that the host system 102 is configured to communicate the clock signal and the initial command signals CMD0, CMD8, ACMD41 at the low voltage level. In particular, when the data lines DAT[3:0] and the command line CMD are pulled up, the host I/O driver circuit 602 may be configured to drive low at least one of the data lines DAT[3:0] or the command line CMD coupled to the level detection circuitry 718. The level detection circuitry 718 may be configured to detect the high-to-low transition and send a level indication signal to the voltage regulator decision logic circuitry 720 that indicates the transition. In response, the voltage regulator decision logic circuitry 720 may output a regulator control signal to the card voltage regulator circuit 608 that configured the card voltage regulator circuit 608 in the low voltage mode.

For the configuration shown in FIG. 7, the SD memory card 104 may be configured to send a response to the host system 102 to indicate that it has detected that the host system 102 is configured to communicate at the low voltage level and that it too is ready to communicate at the low level. The card I/O driver circuit 604 may send in the response signal in various ways. In one example, similar to the configuration in FIG. 6, in response to the card voltage regulator circuit 608 switching from the high voltage mode to the low voltage mode, the card I/O driver circuit 604 may send a response signal to the host system 102 on the communications bus, such as by driving low at least one of the data lines DAT[3:0] and/or the command line CMD. Where the host I/O driver circuit 602 already pulled down one of the data lines DAT[3:0] and/or the command line CMD, then the card I/O driver circuit 604 may pull down a different one of the data lines DAT[3:0] and the command line CMD. Alternatively, the card I/O driver circuit 604 may be configured to response by pulling back up the line that the host I/O driver circuit 604 initially pulled down. Various configurations may be possible. In response to detection of the response signal received from the SD memory card 104, the host interface controller 114 may determine to send the reset command (CMD0).

As previously described, for some example configurations, one way that the host system 102 may detect a connection with the SD memory card 104 is by sensing a resistance on one of the data lines DAT[3:0] or the command line CMD configured as a card detect line. For a particular configuration, the card detect line may be the fourth data line DAT3, although other configurations may be possible. For configuration performing card detection by utilizing a card detect line, the line configured as the card detect line may be coupled to the output of the card voltage regulator circuit 608 via card detect pull up resistor circuitry $R_{CD}$, whereas the other of the data lines DAT[3:0] and the command line CMD may be coupled to the output of the host voltage regulator circuit 608 via data line and command line pull up resistor circuitry $V_{DAT}$, $V_{CMD}$, respectively. In addition to being coupled to the output of the card voltage regulator circuit 608 via the card detect pull up resistor circuitry $R_{CD}$, the card detect line may also be coupled to ground via a card detect pull down resistor circuitry $R_{PD}$. For some example configurations, the card detect pull up resistor circuitry $R_{PD}$ may be located on the card side, and the card detect pull down resistor circuitry $R_{PD}$ may located on the host side. The card detect line, as well as the other lines, may also be coupled to electrostatic discharge (ESD) circuitry, such as diodes, on one or both of the host side and the card side.

As previously described, for configurations where the host system 102 is configured to output the clock signal and the initial command signals CMD0, CMD8, ACMD41 at the low voltage level, there may be an initial mismatch between the voltage levels at which the host and card I/O driver circuits 602, 604 are configured to communicate. That is, the host I/O driver circuit 602 may be configured to communicate at the low voltage level, whereas the card I/O driver circuit 604 may be configured to communicate at the high voltage level. This mismatch may create a current leakage path from the SD memory card 104 to the host system 102 via one or more of the ESD diodes. To reduce or minimize the current leakage effect, a resistance of the card detect pull down resistor circuitry $R_{PD}$ on the host side may be set to provide a relatively strong pull down effect and minimize the changes in voltage potential across the ESD diodes.

Figure 8:
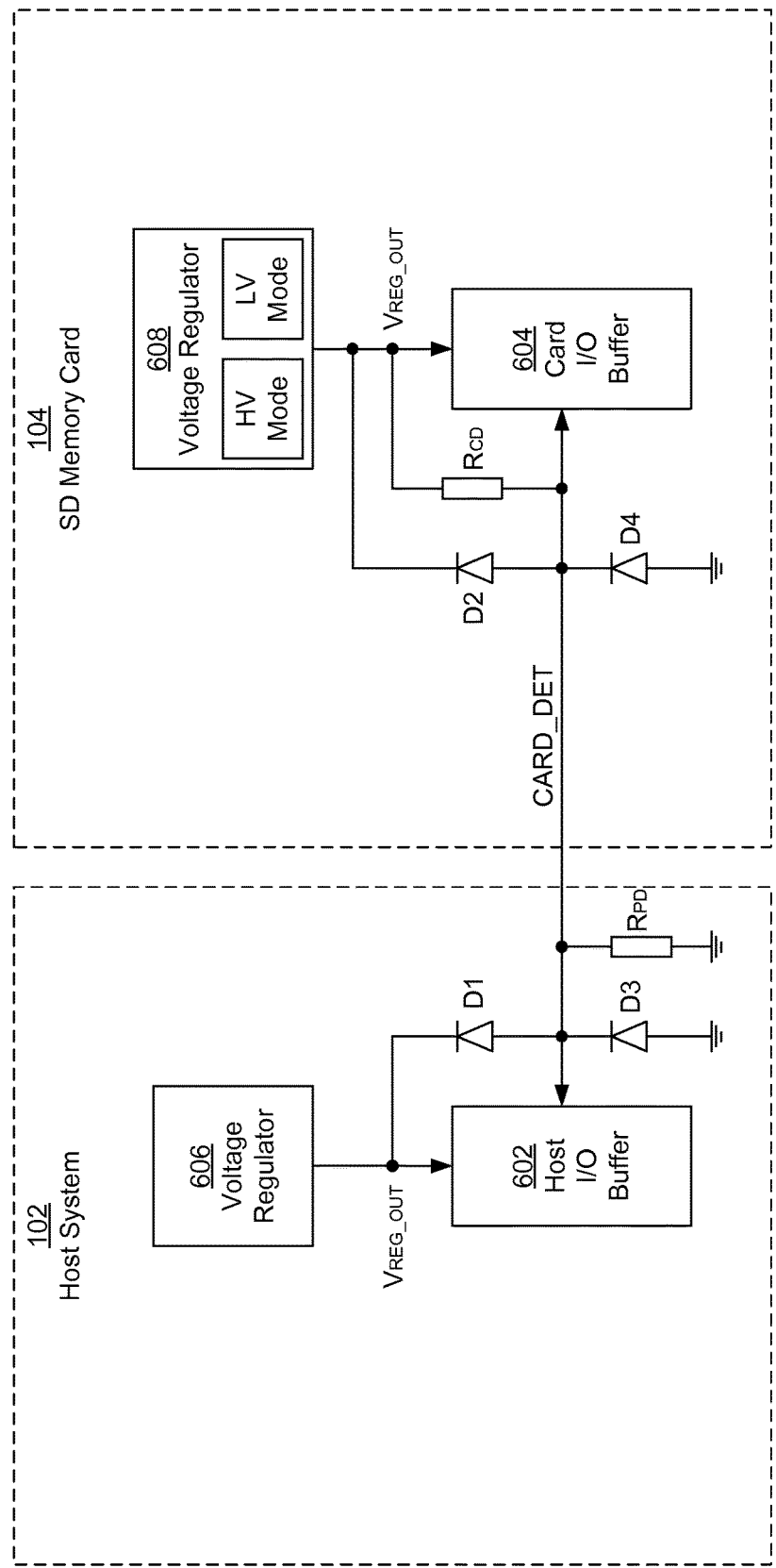
FIG. 8 is a block diagram of an example card detect line formed by the host system and the SD memory card of FIG. 1.

FIG. 8 shows an example circuit schematic of the card detect line CARD_DET coupled to each of the host and card I/O driver circuits 602, 604, as well as the card detect pull up and pull down resistor circuitries $R_{CD}$, $P_{PD}$ and ESD diodes D1, D2, D3, D4. For some example configurations, the card detect pull up resistor circuitry $R_{CD}$ may have a resistance in a range of about 10 kiloOhms (kΩ) to 90 kΩ. In addition, the card detect pull down resistor circuitry $R_{PD}$ may have a resistance in a range of about 5 kΩ to 9 kΩ. In contrast, for configurations where the host I/O driver circuit 602 may be initially configured to communicate at the high voltage level such that there is no initial mismatch, the card detect pull down resistor circuitry $R_{PD}$ may have a resistance in a range of about 200 kΩ to 300 kΩ. By setting (e.g., lowering) the resistance of the card detect pull down resistor circuitry $R_{PD}$ to within the range of about 5-9 kΩ, the pull down effect of the pull down resistor circuitry $R_{PD}$ may be enhanced, which in turn may lower the voltage level of the card detect line CARD_DET to within a range of about 0.25 V to 1.8 V, even initially when the card voltage regulator circuit 608 is outputting its regulator output voltage in the high voltage range (e.g., 2.7 V to 3.6 V).

The lower voltage on the card detect line CARD_DET may minimize current leakage. Further, if by chance a SD memory card configured to operate at the higher voltage level is connected to the host system 102, the pull down resistor circuitry $R_{PD}$ having the lower resistance may protect the host system 102 against high voltage burn out. Also, for some example configurations, the card detect pull up and pull down resistor circuitries $R_{CD}$, $R_{PD}$ may be deactivated upon completion of the initialization process.

Figure 9:
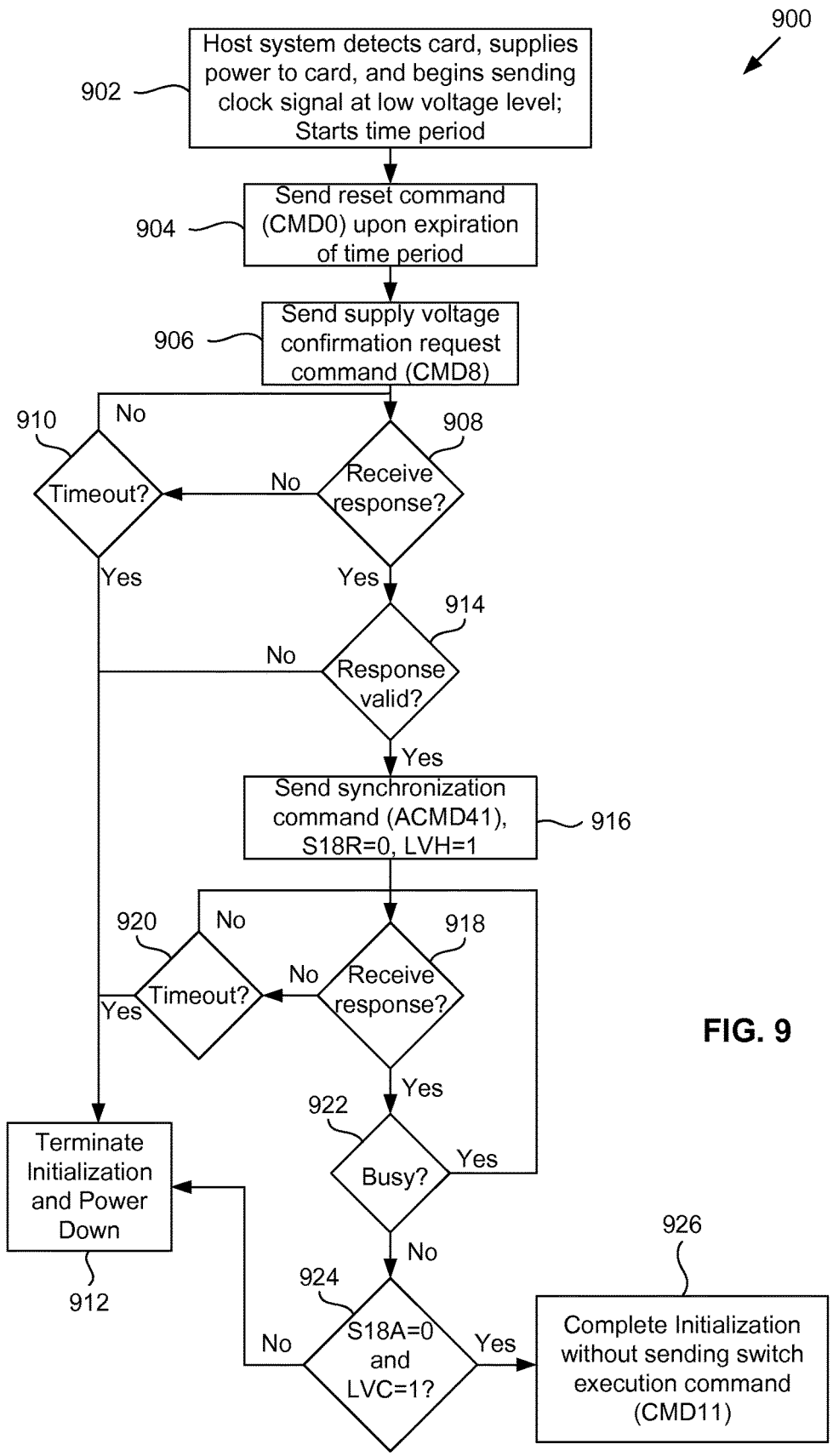
FIG. 9 is a flow chart of an example method of a host system performing an initialization process with a SD memory card.

FIG. 9 shows a flow chart of an example method 900 of a host system performing initialization with a SD memory card, where the host supplies a power supply voltage at a high voltage level and initially communicates with the SD memory card at a low voltage level. At block 902, the host system may detect the SD memory card, supply power to the card at the high voltage level, and begin sending a clock signal at the low voltage level on a clock line of a communications bus. A time period may begin upon sending the clock signal. As previously described, the time period may be greater than 150 microseconds and less than or equal to one millisecond.

At block 904, the time period may expire and the host system may send a reset command signal (CMD0) to the SD memory card on a command line of the communications bus. As previously described. At block 906, after sending the reset command signal (CMD0), the host system may send a supply voltage confirmation request command signal (CMD8) that requests that the SD card confirm that is compatible with the voltage level of the power supply voltage. At block 908, the host system may determine if a response to the supply voltage confirmation request command signal (CMD8) has been received. If not, then at block 910, the host system may determine if a timeout period has expired. If so, then the method may proceed to block 912, where the host system terminates the initialization process and an interface of the host system communicating with the SD memory card may power down. Alternatively, at block 910, if the timeout period has not expired, then the method 900 may proceed back to block 908, where the host system waits for a response.

If a response to the supply voltage confirmation request command signal (CMD8) is received at block 908 within the timeout period, then at block 914, the host system may determine whether the response is valid (i.e., whether the SD memory card is compatible with the voltage level of the power supply voltage). If not, then the method 900 may proceed to block 912, where the host system terminates initialization. Alternatively, at block 914, if the response is valid, then at block 916 the host system may send a synchronization command signal (ACMD41) to the SD memory card. The synchronization command (ACMD41) may include a signaling level field (S18R) containing a value (e.g., S18R=1) that the host system does not want to switch signaling levels for further communication, and a low voltage host (LVH) field containing a value indicating that the host system is configured to initially communicate the clock signal and the initial command signals CMD0, CMD8, and ACMD41 at the low voltage level.

At block 918, if the host system has not received a response to the synchronization command (ACMD41) from the SD memory card, then at block 920, the host system may determine whether a timeout period has expired. If so, then the method 900 may proceed to block 912, where the host system may terminate initialization and power down the interface. Alternatively, if the timeout period has not expired at block 920, then the method 900 may proceed back to 918, where the host system continues to wait for a response from the SD memory card.

If the host system receives a response at block 918, then the host system may check a busy field of the response to determine whether the SD memory card is busy. If so, then the host system may disregard the response and the method 900 may proceed back to block 918, where the host system waits for another response. Alternatively, if busy field of the response indicates that the SD memory card is not busy, then at block 924, the host system may check whether a signaling level field (518A) of the response contains a value indicating that the SD memory card does not want to switch signaling levels, and whether a low voltage card (LVC) field of the response indicates that the SD memory card is already configured to communicate at the low voltage level. If so, then at block 926 the host system may determine that it is finished negotiating the voltage level at which to communicate with the SD memory card and initialization is complete. If not, then the host system may determine that it is not compatible with the SD memory card and the method 900 may proceed to block 912, where the host system terminates initialization and powers down the interface.

Figure 10:
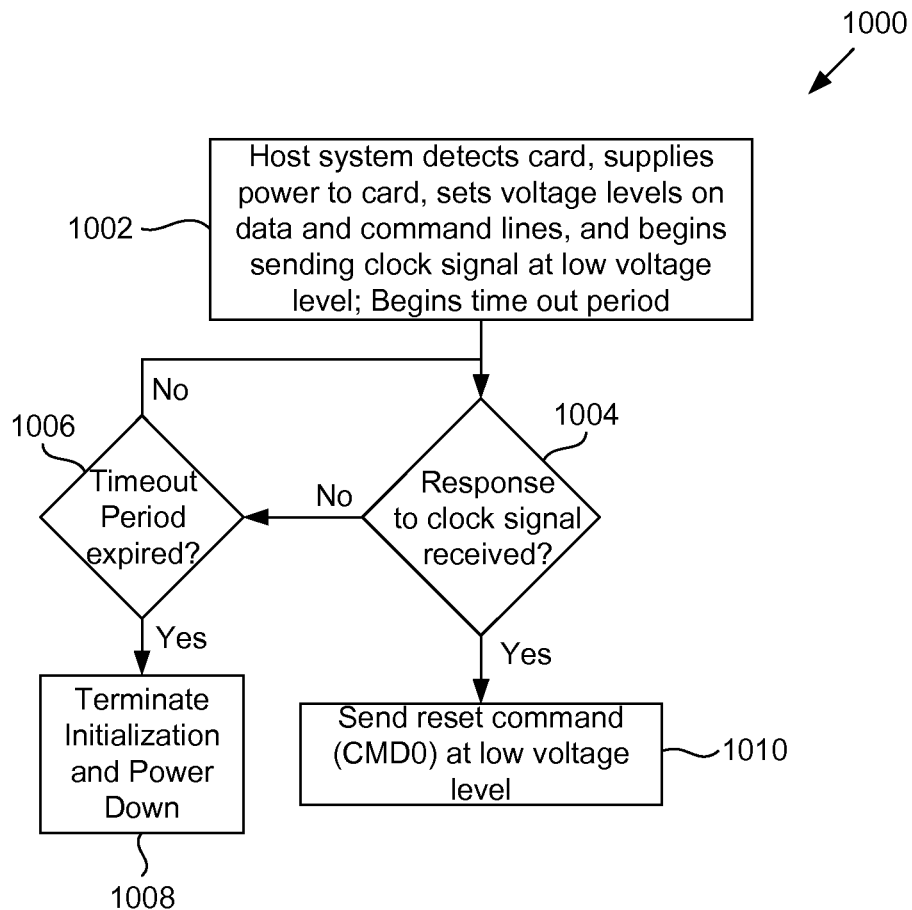
FIG. 10 is a flow chart of an example method of a host system determining whether to send a reset command to a SD memory card.

FIG. 10 is a flow chart of an example method 1000 of a host system determining whether to send a reset command (CMD0) to a SD memory card during an initialization process. At block 1002, the host system may detect the SD memory card, supply power to the card at the high voltage level, set voltage levels on data and command lines on a communications bus as previously described, and begin sending a clock signal at the low voltage level on a clock line of the communications bus. A timeout period may begin upon sending the clock signal.

At block 1004, the host system may determine whether a response signal to the clock signal has been received from the SD memory card. As previously described, the host system may detect the response signal by detecting a change or transition in a voltage level on at least one of the data lines and/or the command line. If the host system determines that a response signal has not been received, then at block 1006, the host system may determine whether the timeout period has expired. If so, then the method 1000 may proceed to block 1008, where the host system may terminate the initialization process and power down an interface connected to the SD memory card. Alternatively, at block 1006, if the timeout period has not expired, then the method 1000 may proceed back to block 1004, where the host system continues to wait for a response.

If at block 1004 the host system receives a response to the clock signal within the timeout period, then at block 1010, the host system may determine that the SD memory card is ready to receive signals at the low voltage level and send the reset command signal (CMD0) at the low voltage level on the command line to the SD memory card. Subsequent initialization events, such as sending the supply voltage confirmation request command (CMD8) and the synchronization command (ACMD41) may be performed by the host system to complete initialization in accordance with blocks 906 to 926 of the example method 900 shown and described with reference to FIG. 9.

Figure 11:
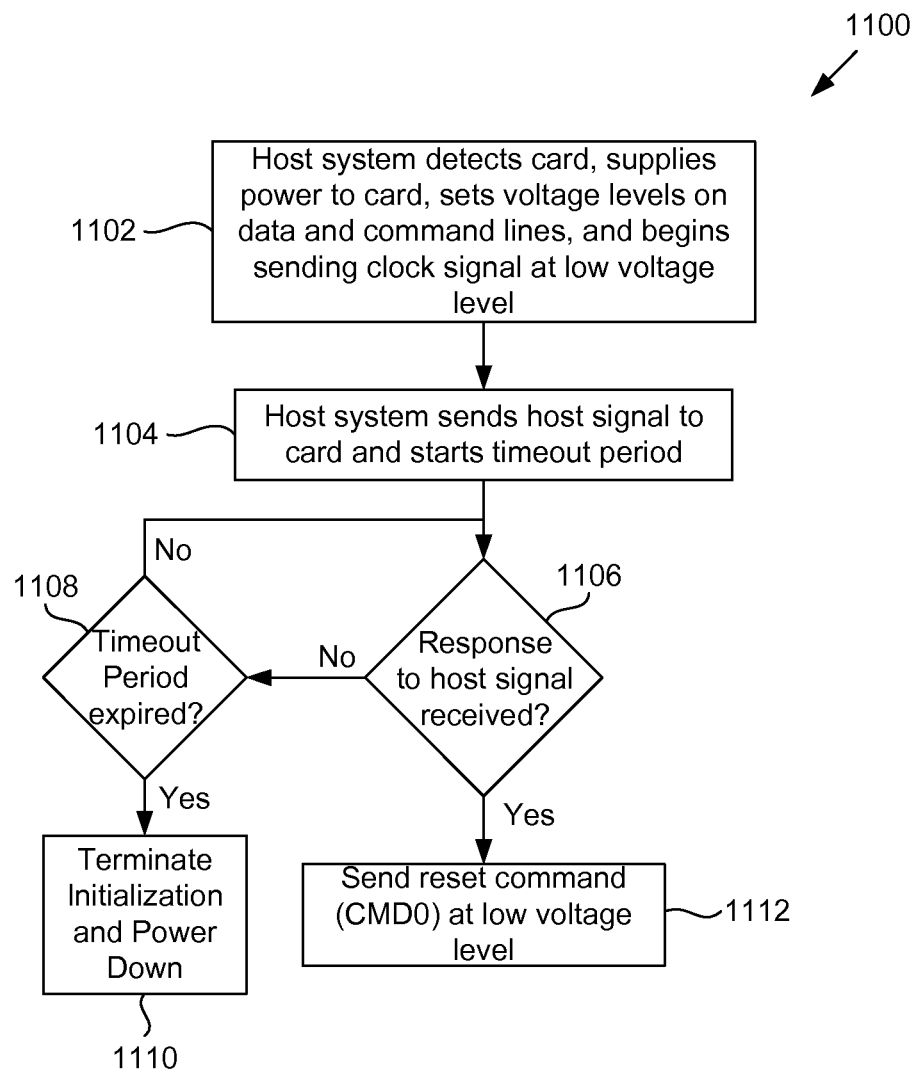
FIG. 11 is a flow chart of another example method of a host system determining whether to send a reset command to a SD memory card.

FIG. 11 is a flow chart of another example method 1100 of a host system determining whether to send a reset command (CMD0) to a SD memory card during an initialization process. At block 1102, the host system may detect the SD memory card, supply power to the card at the high voltage level, set voltage levels on the data and command lines as previously described, and begin sending a clock signal at the low voltage level on a clock line of the communications bus.

At block 1104, the host system may send a host signal on at least one of a plurality of data lines and/or a command line of the communications bus. For some example methods, the host system may do so by pulling down to a low level at least one of the data lines and/or the command line. In addition, at block 1104, the host system may start a timeout period upon sending the host signal.

At block 1106, the host system may determine whether a response signal to the host signal has been received from the SD memory card. As previously described, the host system may detect the response signal by detecting a change in voltage level of at least one of the data lines or the command line. If the host system determines that a response signal has not been received, then at block 1108, the host system may determine whether the timeout period has expired. If so, then the method 1100 may proceed to block 1110, where the host system may terminate the initialization process and power down an interface connected to the SD memory card. Alternatively, at block 1108, if the timeout period has not expired, then the method 1000 may proceed back to block 1106, where the host system continues to wait for a response.

If at block 1106 the host system receives a response to the host signal within the timeout period, then at block 1112, the host system may determine that the SD memory card is ready and/or able to receive command signals at the low voltage level and send the reset command signal (CMD0) at the low voltage level on the command line to the SD memory card. Subsequent initialization events, such as sending the supply voltage confirmation request command (CMD8) and the synchronization command (ACMD41) may be performed by the host system to complete initialization in accordance with blocks 906 to 926 of the example method 900 shown and described with reference to FIG. 9.

Figure 12:
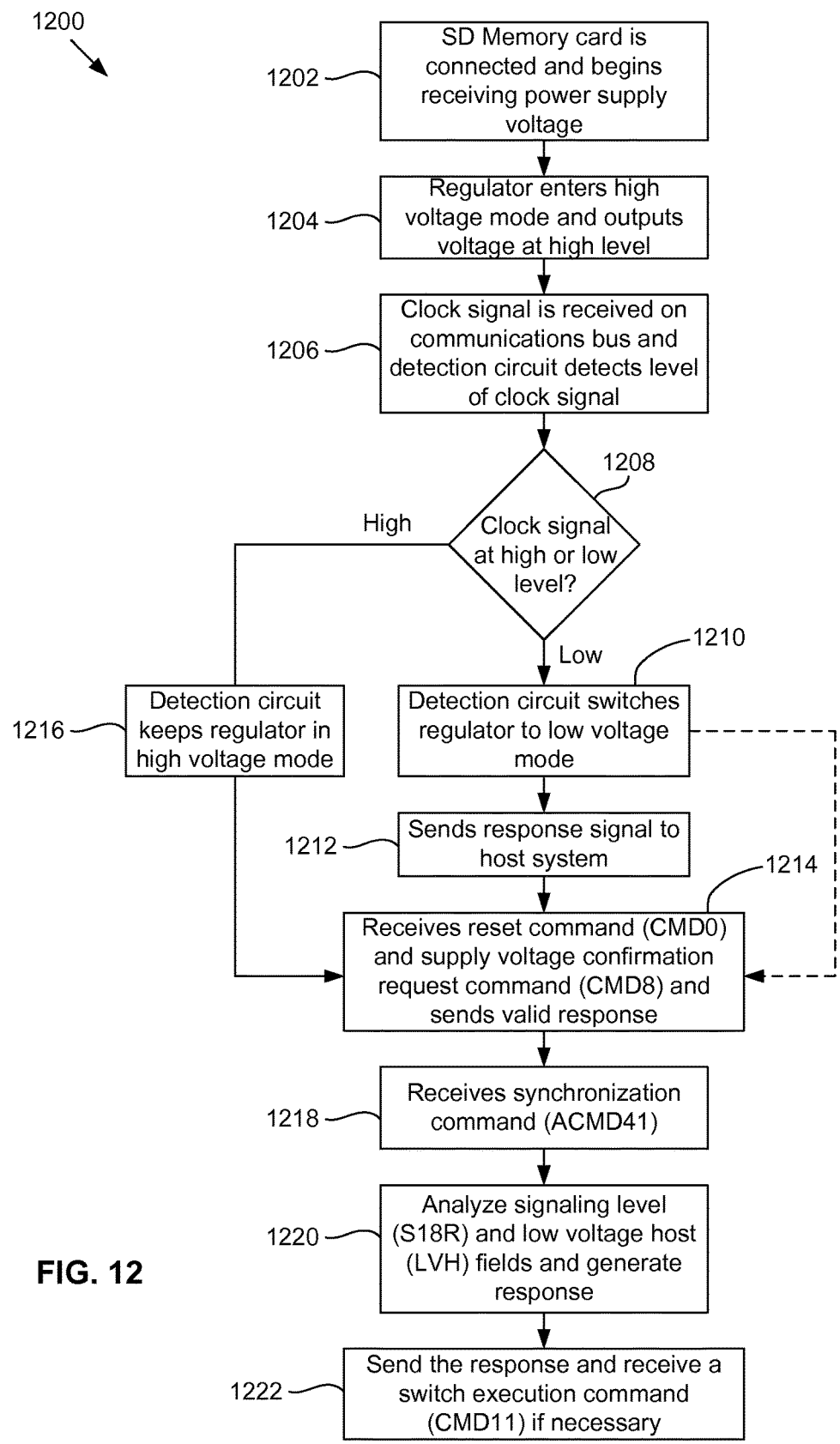
FIG. 12 is a flow chart of an example method of a SD memory card performing an initialization process with a host system.

FIG. 12 is a flow chart of an example method 1200 of a SD memory card performing an initialization process with a host system. At block 1202, the SD memory card may be connected to the host system and begin receiving a power supply voltage from the host system. At block 1204, a regulator of the SD memory card, receiving the power supply voltage, may enter a high voltage mode and begin outputting a regulator output voltage to an I/O driver circuit at a high voltage level.

At block 1206, the SD memory card may receive a clock signal on a communications bus from the host system, and detection circuitry of the SD memory card may detect a voltage level of the clock signal. At block 1208, if the detection circuitry detects that the clock signal is at a low voltage level, then at block 1210, the detection circuitry may switch the regulator to a low voltage mode, causing the regulator to output the regulator output voltage to the I/O driver circuit at the low voltage level. At block 1212, for some example methods, when the detection circuitry detects the clock signal at the low voltage level and the regulator is configured in the low voltage mode, the SD memory card may send a response signal to the host system indicating that the SD memory card is ready to communicate the initialization command signals at the low voltage level. At block 1214, the SD memory card may then receive a reset command (CMD0) and a supply voltage confirmation request command (CMD8) from the host system. Also, at block 1214, the SD memory card may send a response to the supply voltage confirmation request command (CMD8) confirming that the SD memory card is compatible with the level of the power supply voltage. Referring back to block 1210, for some example methods, the SD memory card may not send a response upon detecting the clock signal at the low voltage level and switching the regulator to the low power mode, in which case the method 1200 may proceed directly to block 1214, where the SD memory card may receive the reset command (CMD0) and the supply voltage confirmation request command (CMD8), as denoted by the dotted arrow connecting block 1210 with block 1214.

Referring back to block 1208, if the detection circuitry detects the clock signal at the high voltage level rather than the low voltage level, then at block 1216, the detection circuitry may keep the regulator in the high voltage mode, causing the regulator to continue outputting the regulator output voltage to the I/O driver circuit at the high voltage level. The method 1200 may then proceed to block 1214, where the SD memory card may receive the reset command (CMD0) and the supply voltage confirmation request command (CMD8) from the host system.

At block 1218, after the SD memory card sends a valid response to the supply voltage confirmation request command (CMD8), the SD memory card may receive a synchronization command (ACMD41) from the host system. At block 1220, the SD memory card may analyze a signaling level field (518R) and a low voltage host field (LVH) of the synchronization command (ACMD41) and generate a response. As previously described, if the signaling level field (S18R) indicates that the host system wants to switch to the low voltage level and that it is configured to initially communicate the clock signal and the command signals CMD0, CMD8, ACMD41 at the high voltage level, then the SD memory card may generate a response with a signaling level field (S18A) indicating that it wants to switch to the low voltage level. In addition, the response may indicate in a low voltage card field (LVC) that the SD memory card is not already configured to communicate at the low voltage level. Alternatively, if the signaling level field (S18R) indicates that the host system does not want to switch to the low voltage level and that, in the low voltage host field (LVH), it is configured to initially communicate the clock signal and the command signals CMD0, CMD8, and ACMD41 at the low voltage level, then the response may indicate in the signaling level field (S18A) that the SD memory card does not want to switch voltage levels, and that the SD memory card is already configured to communicate at the low voltage level. In addition, a final synchronization command sent by the SD memory card may indicate that the SD memory card is no longer busy.

At block 1222, the SD memory card may send the response to the host system on the command line of the communications bus. If the signaling level field (S18A) indicates that the SD memory card wants to switch to the low voltage level and the low voltage card field (LVC) indicates that it is not ready to communicate at the low voltage level, the SD memory card may then receive a switch execution command (CMD11) from the host system, instructing the SD memory card to switch to the low voltage level to complete initialization. Alternatively, if the response indicates that the SD memory card does not want to switch to the low voltage level and that it is already configured to communicate at the low voltage level, then initialization may be completed without the SD memory card receiving the switch execution command (CMD11).

Figure 13:
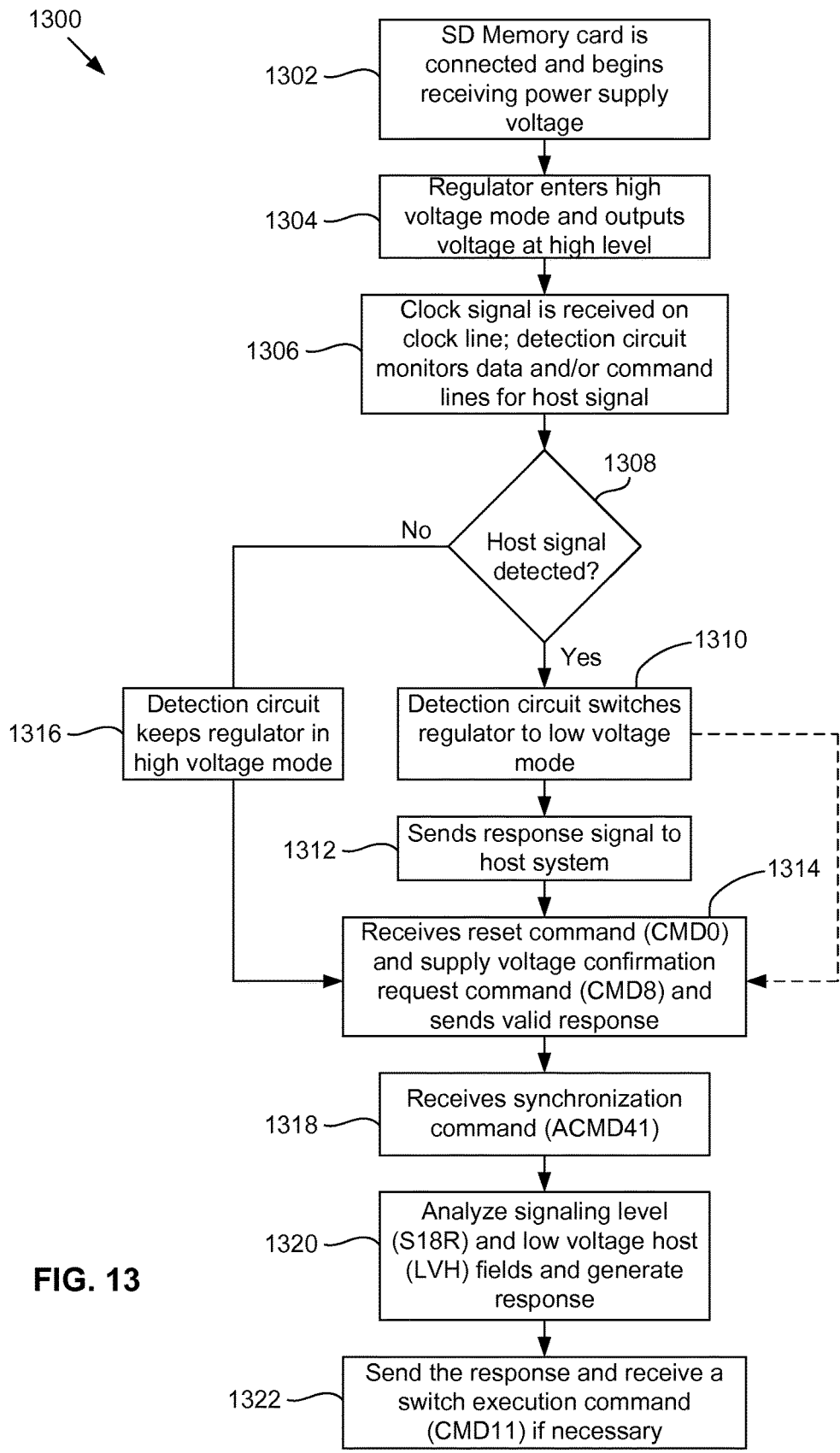
FIG. 13 is a flow chart of another example method of a SD memory card performing an initialization process with a host system.

FIG. 13 is a flow chart of an example method 1300 of a SD memory card performing an initialization process with a host system. At block 1302, the SD memory card may be connected to the host system and begin receiving a power supply voltage from the host system. At block 1304, a regulator of the SD memory card, receiving the power supply voltage, may enter a high voltage mode and begin outputting a regulator output voltage to an I/O driver circuit at a high voltage level.

At block 1306, the SD memory card may receive a clock signal on a communications bus from the host system. Additionally, at block 1306, detection circuitry of the SD memory card may monitor at least one of a plurality of data lines and/or a command line of the communications bus for a host signal. At block 1308, if the detection circuitry detects the host signal, then at block 1310, the detection circuitry may switch the regulator to a low voltage mode, causing the regulator to output the regulator output voltage to the I/O driver circuit at the low voltage level. At block 1312, for some example methods, when the detection circuitry detects the host signal and the regulator is configured in the low voltage mode, the SD memory card may send a response signal to the host system indicating that the SD memory card is ready to communicate the initialization command signals at the low voltage level. At block 1314, the SD memory card may then receive a reset command (CMD0) and a supply voltage confirmation request command (CMD8) from the host system, and confirm that the SD memory card is compatible with the level of the power supply voltage. Referring back to block 1310, for some example methods, the SD memory card may not send a response upon detecting the host signal, in which case the method 1300 may proceed directly to block 1314, where the SD memory card may receive the reset command (CMD0) and the supply voltage confirmation request command (CMD8), as denoted by the dotted arrow connecting block 1310 with block 1314.

Referring back to block 1308, if the detection circuitry does not detect the host signal, then at block 1316, the detection circuitry may keep the regulator in the high voltage mode, causing the regulator to continue outputting the regulator output voltage to the I/O driver circuit at the high voltage level. The method 1300 may then proceed to block 1314, where the SD memory card may receive the reset command (CMD0) and the supply voltage confirmation request command (CMD8) from the host system.

At block 1318, after the SD memory card sends a valid response to the supply voltage confirmation request command (CMD8), the SD memory card may receive a synchronization command (ACMD41) from the host system. At block 1320, the SD memory card may analyze a signaling level field (S18R) and a low voltage host field (LVH) of the synchronization command (ACMD41), and generate a response as previously described. At block 1322, the SD memory card may send the response and if necessary to complete initialization, receive a switch execution command (CMD11) to complete initialization.

Although the configurations and methods to perform initialization with a host system are described above with reference to a SD memory card configured to communicate in accordance with a SD specification, similar configurations and methods may also be implemented with non-volatile memory systems other than SD memory cards, including embedded, solid state drive, or other card-based memory systems. Additionally, similar configurations and methods may be implemented with electronic systems or devices other than non-volatile memory systems, including those that may communicate with a host system/device, receive a power supply voltage from the host system/device, and/or communicate/negotiate voltage level communication parameters over a communications bus during an initialization process with the host system/device. Such electronic devices or systems may include circuit components similar to those described above that detect or determine whether to switch the level at which its regulator is outputting an output voltage to an I/O driver in order to communicate with the host system/device.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

We claim:

1. A device comprising:
   an input/output (I/O) driver circuit configured for communication with a host system via a communications bus comprising a clock line, a command line, and a data line, wherein the I/O driver circuit is configured to first receive a host signal on the clock line before receipt of other host signals upon initial receipt of a power supply voltage from the host system;
   a regulator circuit configured to output a regulator output voltage to the I/O driver circuit, the regulator circuit configurable to output the regulator output voltage at a first voltage level and to output the regulator output voltage at a second voltage level; and
   a host detection circuit configured to:
   detect a voltage level of the host signal received on the clock line of the communications bus; and set the regulator circuit to output the regulator output voltage at one of the first voltage level and the second voltage level based on the detected voltage level of the host signal received on the clock line.

2. The device of claim 1, wherein the I/O driver circuit is configured to send a response signal to the host system via the communications bus in response to the detection of the voltage level of the host signal.

3. The device of claim 2, wherein the I/O driver circuit is configured to pull down at least one line of the communications bus to send the response signal to the host system.

4. The device of claim 1, wherein the detection circuit is further configured to:
  in response to the detection, determine whether to maintain the regulator circuit as being configured to output the regulator output voltage at the first voltage level or switch the regulator circuit to being configured to output the regulator output voltage at the second voltage level.

5. The device of claim 1, wherein the regulator circuit is further configured to:
  receive a power supply voltage at a level corresponding to the first voltage level; and
  initially output the regulator output voltage at the first voltage level in response to receipt of the power supply voltage.

6. The device of claim 5, further comprising a connector configured for removable connection with the host system, wherein the regulator circuit is configured to receive the power supply voltage upon the connector becoming connected to the host system.

7. The device of claim 1, wherein the device comprises a card based system.

8. A circuit comprising:
  an input/output (I/O) driver circuit configured connected to a communications bus comprising a clock line, a data line, and a command line, wherein the I/O driver circuit is configured to first receive a host signal on the clock line before receipt of other host signals upon initial receipt of a power supply voltage from a host system;
  level detection circuitry configured to detect a voltage level of the host signal received on the clock line of the communications bus; and
  regulator decision circuitry configured to set a regulator circuit to output a regulator output voltage at one of a first voltage level and a second voltage level based on the detection.

9. The circuit of claim 8, further comprising an input/output (I/O) driver circuit that is configured to send a response signal to a host system via the communications bus in response to the detection of the voltage level of the host signal.

10. The circuit of claim 9, wherein the I/O driver circuit is configured to pull down at least one line of the communications bus to send the response signal to the host system.

11. The circuit of claim 8, wherein the regulator decision circuitry is further configured to:
  in response to the detection, determine whether to maintain the regulator circuit as being configured to output the regulator output voltage at the first voltage level or switch the regulator circuit to being configured to output the regulator output voltage at the second voltage level.

12. The circuit of claim 8, further comprising the regulator circuit, wherein the regulator circuit is configured to:
  receive a power supply voltage at a level corresponding to the first voltage level; and
  initially output the regulator output voltage at the first voltage level in response to receipt of the power supply voltage.

13. The circuit of claim 12, further comprising a connector configured for removable connection with a host system, wherein the regulator circuit is configured to receive the power supply voltage upon the connector becoming connected to the host system.

\* \* \* \* \*